US012444550B2

(12) United States Patent
Xiang et al.

(10) Patent No.: US 12,444,550 B2
(45) Date of Patent: Oct. 14, 2025

(54) SUPERCAPACITOR

(71) Applicant: SHENZHEN CAPCHEM TECHNOLOGY CO., LTD., Guangdong (CN)

(72) Inventors: Xiaoxia Xiang, Guangdong (CN); Zhengsheng Zhang, Guangdong (CN); Yunxian Qian, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 66 days.

(21) Appl. No.: 18/693,517

(22) PCT Filed: Sep. 21, 2022

(86) PCT No.: PCT/CN2022/120106
§ 371 (c)(1),
(2) Date: Mar. 20, 2024

(87) PCT Pub. No.: WO2023/071628
PCT Pub. Date: May 4, 2023

(65) Prior Publication Data

US 2025/0140487 A1 May 1, 2025

(30) Foreign Application Priority Data

Oct. 28, 2021 (CN) ......................... 202111262960.1

(51) Int. Cl.
*H01G 11/64* (2013.01)
*H01G 11/04* (2013.01)
*H01G 11/60* (2013.01)

(52) U.S. Cl.
CPC ............. *H01G 11/64* (2013.01); *H01G 11/04* (2013.01); *H01G 11/60* (2013.01)

(58) Field of Classification Search
None
See application file for complete search history.

(56) References Cited

U.S. PATENT DOCUMENTS

2025/0140487 A1* 5/2025 Xiang .................... H01G 11/62

FOREIGN PATENT DOCUMENTS

| | | | | | |
|---|---|---|---|---|---|
| CN | 1800191 | A | | 7/2006 | |
| CN | 107887176 | A | * | 4/2018 | H01G 11/64 |
| JP | 2009065074 | A | * | 3/2009 | |
| JP | 4650625 | B2 | * | 3/2011 | H01G 11/64 |
| WO | WO-2018058837 | A1 | * | 4/2018 | H01G 11/64 |
| WO | WO-2020114338 | A1 | * | 6/2020 | H01G 11/62 |

OTHER PUBLICATIONS

International Search Report of PCT Patent Application No. PCT/CN2022/120106 issued on Dec. 8, 2022.

* cited by examiner

*Primary Examiner* — Dion R. Ferguson

(57) ABSTRACT

In order to overcome the problem that the electrochemical performance of the existing supercapacitor is seriously deteriorated at low temperature, the application provides a supercapacitor, comprising a positive electrode, a negative electrode and an organic electrolyte solution, wherein the organic electrolyte solution comprises an organic electrolyte, a proton inert solvent and an additive, and the additive comprises a compound represented by structural formula 1:

Structural formula 1

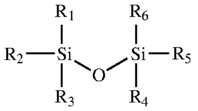

wherein $R_1$-$R_6$ are each independently selected from a hydrocarbon group with 1-5 carbon atoms, a siloxane group substituted by a hydrocarbon group with 1-3 carbon atoms, an unsubstituted siloxane group, or hydrogen;

the positive electrode and negative electrode are both porous carbon materials, and the porous carbon material and the compound represented by structural formula 1 meet the following condition:

$$0.1 \leq \frac{BET * Vt * Mt}{1700} \leq 7.5.$$

The supercapacitor provided by the application has lower ESR (equivalent series resistance) and better high and low temperature performances.

10 Claims, No Drawings

SUPERCAPACITOR

TECHNICAL FIELD

The application belongs to the technical field of energy storage electronic components, and particularly relates to a supercapacitor.

BACKGROUND

Supercapacitor is one of the most promising energy storage devices in the field of new energy, and it is considered as the most promising new green energy in the 21st century. Electric double-layer supercapacitors store energy by electrostatic polarization of electrolyte, and its energy storage mechanism does not involve chemical reactions, and it is highly reversible. Supercapacitors have the advantages of fast charging, long cycle life and high power density up to 300 W/kg-500 W/kg. Electrolyte solutions and electrode materials are the two core components of supercapacitors, and for electric double-layer capacitors, electrolyte is the heart of "double electricity", which is used for ion conduction of positive and negative carbon materials and plays a vital role in the working voltage, leakage current, internal resistance, capacity and temperature characteristics of electric double-layer capacitors.

For the existing commercial supercapacitors, there are mainly AN (acetonitrile) system, PC (propylene carbonate) system, GBL(γ-butyrolactone) system, SL (sulfolane) system and electric double layer capacitor of activated carbon-ionic liquid system At present, in the commercial AN system, the working voltage window has been expanded to 3.0V, and the working temperature range is −40° C.~65° C., which has a broad share and competitiveness in the ultra-capacity market. With the development of the ultra-capacity market, higher requirements are put forward for the environmental use temperature of supercapacitors, especially in some extremely cold areas such as military industry, where certain electronic equipment needs to work below −40° C. At such temperature, the conventional electrolyte would solidify, the ion transport channel would be blocked, the conductivity is extremely low, and the compatibility between the electrolyte and positive and negative electrode materials is poor, which could not meet the requirements of low temperature resistance and high voltage maintenance for supercapacitors. People have been trying to find a solvent with low melting point for the auxiliary solvent to be added into AN system, for the purpose of addressing the problem of solidification of electrolyte at low temperature. However, while solving the problem of electrolyte solidification, the addition of auxiliary solvent further aggravated the compatibility problem between solvent and positive and negative electrode materials, and affected the transmission ability of anion and cation.

SUMMARY OF THE INVENTION

Aiming at the problem that the electrochemical performance of the existing supercapacitor is seriously deteriorated at low temperature, the application provides a supercapacitor.

The technical solutions adopted by the application to solve the technical problem are as follows.

The application provides a supercapacitor, comprising a positive electrode, a negative electrode and an organic electrolyte solution, wherein the organic electrolyte solution comprises an organic electrolyte, a proton inert solvent and an additive, and the additive comprises a compound represented by structural formula 1:

Structural formula 1

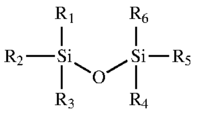

wherein R1-R6 are each independently selected from a hydrocarbon group with 1-5 carbon atoms, a siloxane group substituted by a hydrocarbon group with 1-3 carbon atoms, an unsubstituted siloxane group, or hydrogen;

the positive electrode and negative electrode are both porous carbon materials, and the porous carbon material and the compound represented by structural formula 1 meet the following condition:

$$0.1 \leq \frac{BET * Vt * Mt}{1700} \leq 7.5$$

where BET is a specific surface area of the porous carbon material in $m^2/g$; Vt is a ratio of mesoporous specific surface area of the porous carbon material to micropore specific surface area of the porous carbon material; Mt is a mass percentage of the compound represented by structural formula 1 in the organic electrolyte solution, and the unit is %.

Optionally, $R_1$-$R_6$ are each independently selected from an alkyl group with 1-5 carbon atoms, a dimethylsiloxane group, a trimethylsiloxane group or hydrogen.

Optionally, the compound represented by structural formula 1 is selected from one or more of the following compounds:

Compound 1

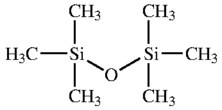

Compound 2

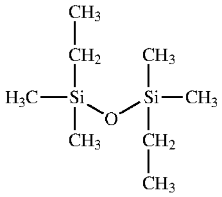

Compound 3

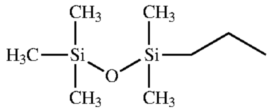

Compound 4

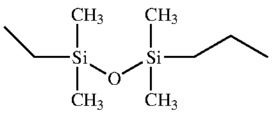

-continued

Compound 5

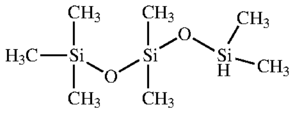

Compound 6

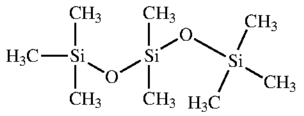

Compound 7

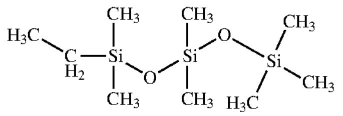

Compound 8

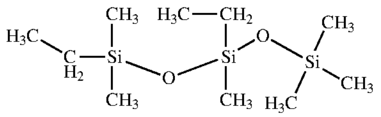

Optionally, the addition amount Mt of the compound represented by structural formula 1 is 0.1%-5% based on a total mass of the organic electrolyte solution being 100%.

Optionally, the specific surface area of the porous carbon material BET is 1200-2000 $m^2/g$.

Optionally, the ratio Vt of mesoporous specific surface area of the porous carbon material to micropore specific surface area of the porous carbon material is 0.9-3.5.

Optionally, the mesoporous specific surface area of the porous carbon material is 800-1400 $m^2/g$, and the micropore specific surface area of the porous carbon material is 400-900 $m^2/g$.

Optionally, the porous carbon material is selected from activated carbon.

Optionally, in the organic electrolyte solution, a concentration of the organic electrolyte is 0.5-3.0 mol/L.

Optionally, the organic electrolyte is selected from one or more of tetraethyl ammonium tetrafluoroborate, tetramethyl ammonium tetrafluoroborate, tetrapropyl ammonium tetrafluoroborate, tetrabutyl ammonium tetrafluoroborate, methyl triethyl ammonium tetrafluoroborate, diethyl dimethyl ammonium tetrafluoroborate, ethyl trimethyl ammonium tetrafluoroborate, N,N-dimethyl pyrrolidine ammonium tetrafluoroborate, N-ethyl-N-methyl pyrrolidine ammonium tetrafluoroborate, N-propyl-N-methyl pyrrolidine ammonium tetrafluoroborate, N—N-tetramethylene pyrrolidine ammonium tetrafluoroborate, spiro-(1,1')-dipyrrolidine ammonium tetrafluoroborate, N,N-dimethyl piperidine ammonium tetrafluoroborate, N,N-diethyl piperidine ammonium tetrafluoroborate, N,N-dimethyl morpholine ammonium tetrafluoroborate, 1-ethyl-3-methylimidazole ammonium tetrafluoroborate, bis (trifluoromethylsulfonyl) imines such as tetraethyl ammonium tetrafluoroborate, tetramethyl bis (trifluoromethylsulfonyl) iminium salt, tetrapropyl bis (trifluoromethylsulfonyl) iminium salt, tetrabutyl bis (trifluoromethylsulfonyl) iminium salt, methyl triethyl bis (trifluoromethylsulfonyl) iminium salt, diethyl dimethyl bis (trifluoromethylsulfonyl) iminium salt, trimethyl ethyl bis (trifluoromethylsulfonyl) iminium salt, N,N-dimethyl pyrrolidine bis (trifluoromethylsulfonyl) iminium salt, bis (fluorosulfonyl) iminium salt such as tetraethyl ammonium tetrafluoroborate, tetramethyl bis (fluorosulfonyl) iminium salt, tetrapropyl bis (fluorosulfonyl) iminium salt, tetrabutyl bis (fluorosulfonyl) iminium salt, methyltriethyl bis (fluorosulfonyl) iminium salt, diethyldimethyl bis (fluorosulfonyl) iminium salt, trimethyl ethyl bis (fluorosulfonyl) iminium salt, N,N-dimethyl pyrrolidine bis (fluorosulfonyl) ammonium salt, ammonium hexafluorophosphate such as tetraethyl ammonium hexafluorophosphate, tetramethyl ammonium hexafluorophosphate, tetrapropyl ammonium hexafluorophosphate, tetrabutyl ammonium hexafluorophosphate, methyl triethyl ammonium hexafluorophosphate, triethyl methyl ammonium hexafluorophosphate and diethyl dimethyl ammonium hexafluorophosphate.

According to the supercapacitor provided by the application, the inventor found through a lot of experiments that, by adding the compound represented by structural formula 1 as an additive to the organic electrolyte solution, and properly adjusting the specific surface area of the porous carbon material BET, the ratio Vt of mesoporous specific surface area to micropore specific surface area and the addition amount Mt of the compound represented by structural formula 1 under the condition of $$0.1 \leq \frac{BET * Vt * Mt}{1700} \leq 7.5,$$

the improvement effect of the compound represented by structural formula 1 on the electrochemical performance of the supercapacitor at low temperature would be fully exerted, and the organic electrolyte solution would not be solidified at ultra-low temperature. At the same time, the compatibility between organic electrolyte solution and positive and negative electrode materials is improved, the transmission of anions and cations in the organic electrolyte solution and positive and negative electrode materials is optimized, and the conductivity is improved, thus significantly improving the ESR (equivalent series resistance) and high and low temperature performances of supercapacitors.

DETAILED DESCRIPTION OF DISCLOSED EMBODIMENTS

In order to make the technical solutions, beneficial effects and technical problems solved by the application more clear, the application will be further illustrated in detail with embodiments. It should be understood that the specific embodiments described here are merely for explaining the application, but not intended to limit the application.

In the description of the present application, the term "mesoporous" refers to a hole with a pore diameter of 2 to 50 nm. The term "micropore" refers to a hole with a pore diameter of less than 2 nm.

The embodiment of the application provides a supercapacitor, comprising a positive electrode, a negative electrode and an organic electrolyte solution, wherein the organic electrolyte solution comprises an organic electrolyte, a proton inert solvent and an additive, and the additive comprises a compound represented by structural formula 1:

Structural formula 1

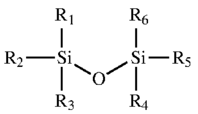

wherein R1-R6 are each independently selected from a hydrocarbon group with 1-5 carbon atoms, a siloxane group substituted by a hydrocarbon group with 1-3 carbon atoms, an unsubstituted siloxane group, or hydrogen;

the positive electrode and negative electrode are both porous carbon materials, and the porous carbon material and the compound represented by structural formula 1 meet the following condition:

$$0.1 \leq \frac{BET * Vt * Mt}{1700} \leq 7.5$$

where BET is a specific surface area of the porous carbon material in $m^2/g$; Vt is a ratio of mesoporous specific surface area of the porous carbon material to micropore specific surface area of the porous carbon material; Mt is a mass percentage of the compound represented by structural formula 1 in the organic electrolyte solution, and the unit is %.

Through a lot of experiments, the inventor found that when the supercapacitor works, the compound represented by structural formula 1 reacts with some oxygen-containing groups on the surface of positive and negative electrode materials (micropore surface and mesoporous surface) to eliminate the negative influence of oxygen-containing group on the electrolyte solution and enhance the compatibility of organic electrolyte solution with positive and negative electrode materials. Meanwhile, a conductive bridge is built between the compound represented by structural formula 1, positive and negative electrode materials and organic electrolyte solution, through which anions and cations could be quickly adsorbed and desorbed on the surfaces of positive and negative electrode materials. Thus, the anions and cations can be rapidly adsorbed and desorbed at ultra-low temperature (−55° C.), and the conductivity of the electrolyte solution is enhanced.

At the same time, due to the modification effect of the compound represented by structural formula 1 on the micropore and mesoporous surfaces of the positive and negative electrode materials, the influence of groups is eliminated on the inner surface of the pore, so that the surface properties of the positive and negative electrode materials are changed. And the ratio of micropore to mesoporous of the positive and negative electrode materials affects the modification effect of the compound represented by structural formula 1 on the positive and negative electrode materials. Therefore, the inventor comprehensively designed the characterization parameters of the positive and negative electrodes (by properly adjusting the specific surface area of the porous carbon material BET and the ratio Vt of mesoporous specific surface area to micropore specific surface area) and the mass percentage Mt of the compound represented by structural formula 1 in the organic electrolyte solution, and reasonably quantified the correlation of the above parameters. Under the conditions of $$0.1 \leq \frac{BET * Vt * Mt}{1700} \leq 7.5,$$

the high and low temperature performances of the supercapacitor and the conductivity of the electrolyte solution can be cooperatively improved without adversely affecting the high temperature and high pressure performances of the supercapacitor.

In a preferred embodiment, $R_1$-$R_6$ are each independently selected from an alkyl group with 1-5 carbon atoms, a dimethylsiloxane group, a trimethylsiloxane group or hydrogen.

In some embodiments, the compound represented by structural formula 1 is selected from one or more of the following compounds:

Compound 1

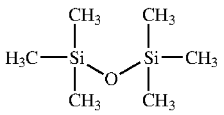

Compound 2

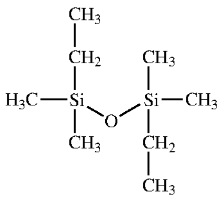

Compound 3

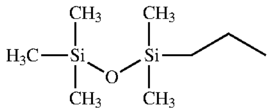

Compound 4

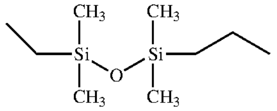

Compound 5

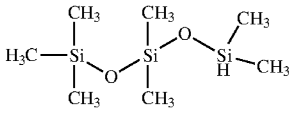

Compound 6

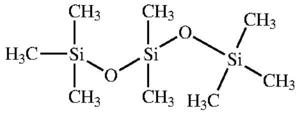

Compound 7

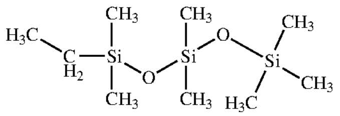

Compound 8

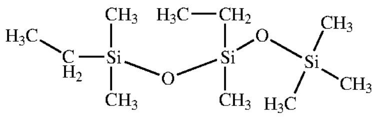

It should be noted that the above compounds are only preferred compounds based on the embodiments of the present application, and not intended to limit the present application.

In some embodiments, the addition amount Mt of the compound represented by structural formula 1 is 0.1%-5% based on a total mass of the organic electrolyte solution being 100%.

In a preferred embodiment, the addition amount Mt of the compound represented by structural formula 1 is 0.1%-3% based on a total mass of the organic electrolyte solution being 100%.

The addition of the compound represented by structural formula 1 is beneficial to improve the ionic conductivity of organic electrolyte solution, so that the supercapacitor can be used at higher working voltage (above 2.7V), and has high power density, energy density and good cycle life at −55° C., and can improve the high and low temperature performances of the supercapacitor.

In some embodiments, the specific surface area of the porous carbon material BET is 1200-2000 $m^2/g$.

In a preferred implementation, the specific surface area of the porous carbon material BET is 1400-1800 $m^2/g$.

The deintercalation reaction of organic electrolyte mainly occurs at the electrode/electrolyte interface. On the premise that the apparent volume is the same and the organic electrolyte solution can be fully wetted, the larger the specific surface area of porous carbon material is, the larger the electrode/electrolyte interface would be, the faster the deintercalation speed of organic electrolyte ions would be, and the better the performance of the electrode would be. However, the increase of specific surface area would easily lead to insufficient structural strength of the positive and negative electrodes, resulting in the problems of material shedding and decomposition of organic electrolyte solution. Meanwhile, the specific surface area BET of the positive and negative electrodes also directly affects the modification of the surfaces of the positive and negative electrodes by the compound represented by structural formula 1 per unit mass, thus affecting the performance of the supercapacitor.

In some embodiments, the ratio Vt of mesoporous specific surface area of the porous carbon material to micropore specific surface area of the porous carbon material is 0.9-3.5.

In some embodiments, the mesoporous specific surface area of the porous carbon material is 800-1400 $m^2/g$, and the micropore specific surface area of the porous carbon material is 400-900 $m^2/g$.

Specifically, the specific surface area of the porous carbon material BET, the mesoporous specific surface area and the micropore specific surface area can be tested by the following methods.

(1) Put the sample to be tested (30-500 mg, which varies according to the specific surface area of the sample) into a sample tube.

(2) Install the sample tube to the degassing station. When installing the sample tube, align the sample tube with the port and tighten the screw to ensure the sealing safety. Then put the heating bag on the sample tube, set the parameters such as file information and degassing temperature, turn on the vacuum pump, and start heating and vacuum degassing the sample to remove the gas adsorbed on the surface of the material.

(3) After degassing, turn off the heating power supply, and backfill helium after the sample is cooled to room temperature. After helium gas is filled to normal pressure, detach the sample tube, immediately press the rubber stopper, weigh it to 0.1 mg, and record the weight of the sample tube filled with helium gas, stopper and filler rod as the gross weight of the sample tube. Use the same sample tube, stopper and filler rod to perform the following steps. The sample is weighed by decrement method. 1. Put the bracket into the balance, peel and return to zero. 2. Press a sealing filter plug on the sample tube or put the plug on the bracket, and record the reading m1. 3. Pour the sample into the sample tube through a funnel, press the sealing plug or plug, weigh and record the reading m2. 4. Put the sample tube into the degassing station for degassing. 5. Put the degassed and cooled sample tube into the bracket after the step of returning to zero, weigh and record the reading m3. 6. Minus the reading m1 from m3 to get the sample quality.

(4) Put the weighed sample tube to the analysis station. Add liquid nitrogen to the Dewar bottle, and input the sample quality into the analysis file. Set the test parameters and start the adsorption and desorption test process.

(5) After that test, take the sample out of the sample tube. Wash the sample tube and dry it for later use, then process the data by computer, and calculate the specific surface area, pore volume, average pore size and pore size distribution with the adsorption isotherm.

The above analysis is merely based on the influence of a single parameter on the supercapacitor, but in the actual application process of the supercapacitor, the above parameters are interrelated and inseparable. The correlation formula proposed by the application relates the above parameters, which together affect the high-temperature and low-temperature electrochemical performances of the supercapacitor, and meet the condition of $$0.1 \le \frac{BET * Vt * Mt}{1700} \le 7.5.$$

Thus, the supercapacitor can ensure both the high-temperature resistance and high-voltage resistance performances, and have higher power density and cycle life at ultra-low temperature. If $$\frac{BET * Vt * Mt}{1700}$$

is too high or too low, the dynamics of the supercapacitor would deteriorate, and the high and low temperature performances would deteriorate.

In a preferred embodiment, the porous carbon material is selected from activated carbon.

In some embodiments, the positive electrode further comprises a positive electrode collector, and the porous carbon material covers the positive electrode collector to form the positive electrode. The negative electrode further comprises a negative electrode collector, and the porous carbon material covers the negative electrode collector to form the negative electrode.

In some embodiments, the addition concentration of the organic electrolyte is 0.5-3.0 mol/L in the organic electrolyte solution.

In a preferred embodiment, the addition concentration of the organic electrolyte is 0.8-2.0 mol/L in the organic electrolyte solution.

In some embodiments, the organic electrolyte is selected from one or more of tetraethyl ammonium tetrafluoroborate, tetramethyl ammonium tetrafluoroborate, tetrapropyl ammonium tetrafluoroborate, tetrabutyl 1 ammonium tetrafluoroborate, methyl triethyl ammonium tetrafluoroborate, diethyl dimethyl ammonium tetrafluoroborate, ethyl trimethyl ammonium tetrafluoroborate, N,N-dimethyl pyrrolidine ammonium tetrafluoroborate, N-ethyl-N-methyl pyrrolidine ammonium tetrafluoroborate, N-propyl-N-methyl pyrrolidine ammonium tetrafluoroborate, N—N-tetramethylene pyrrolidine ammonium tetrafluoroborate, spiro-(1,1')-dipyrrolidine ammonium tetrafluoroborate, N,N-dimethyl piperidine ammonium tetrafluoroborate, N,N-diethyl piperidine ammonium tetrafluoroborate, N,N-dimethyl morpholine ammonium tetrafluoroborate, 1-ethyl-3-methylimidazole ammonium tetrafluoroborate, bis (trifluoromethylsulfonyl) imines such as tetraethyl ammonium tetrafluoroborate, tetramethyl bis (trifluoromethylsulfonyl) iminium salt, tetrapropyl bis (trifluoromethylsulfonyl) iminium salt, tetrabutyl bis (trifluoromethylsulfonyl) iminium salt, methyl triethyl bis (trifluoromethylsulfonyl) iminium salt, diethyl dimethyl bis (trifluoromethylsulfonyl) iminium salt, trimethyl ethyl bis (trifluoromethylsulfonyl) iminium salt, N,N-dimethyl pyrrolidine bis (trifluoromethylsulfonyl) iminium salt, bis (fluorosulfonyl) iminium salt such as tetraethyl ammonium tetrafluoroborate, tetramethyl bis (fluorosulfonyl) iminium salt, tetrapropyl bis (fluorosulfonyl) iminium salt, tetrabutyl bis (fluorosulfonyl) iminium salt, methyltriethyl bis (fluorosulfonyl) iminium salt, diethyldimethyl bis (fluorosulfonyl) iminium salt, trimethyl ethyl bis (fluorosulfonyl) iminium salt, N,N-dimethyl pyrrolidine bis (fluorosulfonyl) ammonium salt, ammonium hexafluorophosphate such as tetraethyl ammonium hexafluorophosphate, tetramethyl ammonium hexafluorophosphate, tetrapropyl ammonium hexafluorophosphate, tetrabutyl ammonium hexafluorophosphate, methyl triethyl ammonium hexafluorophosphate, triethyl methyl ammonium hexafluorophosphate and diethyl dimethyl ammonium hexafluorophosphate.

In some embodiments, the proton inert solvent is selected from one or more of acetonitrile, propionitrile, methoxypropionitrile, γ-butyrolactone, γ-valerolactone, ethylene carbonate, propylene carbonate, N,N-dimethylformamide, dimethylacetamide, 1-methyl-2-pyrrolidone, dimethoxyethane, 2-methoxyethyl ether, tetrahydrofuran, dioxolame, dimethyl carbonate, diethyl carbonate, ethyl methyl carbonate, sulfolane, dimethyl sulfoxide, dimethyl sulfone, ethyl methyl sulfone, methyl isopropyl sulfone, ethyl isopropyl sulfone, ethyl isobutyl sulfone, isopropyl isobutyl sulfone, isopropyl-s-butyl sulfone and butyl isobutyl sulfone.

In some embodiments, the supercapacitor further comprises a separator, and the separator is positioned between the positive electrode and the negative electrode.

The present application will be further illustrated by embodiments.

TABLE 1

Composition of Capacitors of Embodiments 1-16 and Comparative examples 1-9

| Group | Specific surface area of porous carbon material (BET) $m^2/g$ | Ratio Vt of mesoporous specific surface area to micropore specific surface area of porous carbon material | Compound presented by structural formula 1 and its content Mt % | | $\frac{BET*Vt*Mt}{1700}$ |
|---|---|---|---|---|---|
| Embodiment 1 | 1700 | 1.0 | Compound 1 | 0.1 | 0.1 |
| Embodiment 2 | 1500 | 3.5 | Compound 1 | 1.5 | 4.63 |
| Embodiment 3 | 1400 | 1.2 | Compound 1 | 2.5 | 2.47 |
| Embodiment 4 | 1550 | 2.8 | Compound 1 | 1.8 | 4.60 |
| Embodiment 5 | 1800 | 0.91 | Compound 1 | 2.0 | 1.93 |
| Embodiment 6 | 1750 | 0.95 | Compound 1 | 1.5 | 1.47 |
| Embodiment 7 | 1700 | 2.5 | Compound 1 | 3.0 | 7.5 |
| Embodiment 8 | 1400 | 1.4 | Compound 1 | 0.3 | 0.35 |
| Embodiment 9 | 1450 | 3.0 | Compound 1 | 2.9 | 7.42 |
| Embodiment 10 | 1200 | 0.99 | Compound 1 | 1.6 | 1.12 |
| Embodiment 11 | 1500 | 2.8 | Compound 1 | 2.7 | 6.67 |
| Embodiment 12 | 2000 | 1.5 | Compound 1 | 2.0 | 3.5 |
| Embodiment 13 | 1700 | 1.0 | Compound 1 | 1.0 | 1.0 |
| Embodiment 14 | 1700 | 1.0 | Compound 5 | 1.0 | 1.0 |
| Embodiment 15 | 1700 | 1.0 | Compound 3 | 1.0 | 1.0 |
| Embodiment 16 | 1700 | 1.0 | Compound 4 | 1.0 | 1.0 |
| Comparative example 1 | 1600 | 1.6 | Compound 1 | 0 | 0 |
| Comparative example 2 | 1700 | 0.9 | Compound 1 | 0 | 0 |
| Comparative example 3 | 1800 | 1.0 | Compound 1 | 0 | 0 |
| Comparative example 4 | 1650 | 0.8 | Compound 1 | 1.0 | 0 |
| Comparative example 5 | 1700 | 0.1 | Compound 1 | 0.5 | 0.05 |
| Comparative example 6 | 1700 | 0.3 | Compound 1 | 0.2 | 0.06 |
| Comparative example 7 | 1700 | 4.1 | Compound 1 | 2.0 | 8.2 |
| Comparative example 8 | 1700 | 4.5 | Compound 1 | 2.0 | 9.0 |
| Comparative example 9 | 2500 | 3.5 | Compound 1 | 1.5 | 7.72 |

Embodiment 1

This embodiment is used to explain the supercapacitor disclosed by the application and its preparation method, including the following steps.

Preparation of the organic electrolyte solution: tetraethyl ammonium tetrafluoroborate was used as organic electrolyte and acetonitrile (AN) as solvent to prepare 1.0 mol/L electrolyte, and then the compound represented by structural formula 1 with the mass content shown in Table 1 was added to obtain the organic electrolyte.

A supercapacitor model was assembled in a glove box: the battery core consisted of two collectors made of aluminum foil, two working electrodes made of activated carbon with specific surface area of mesoporous/micropore as shown in Table 1, and a fiber cloth diaphragm interposed between them. The battery core was immersed in the organic electrolyte and sealed by aluminum case and colloidal particles.

Embodiments 2-16

Embodiments 2-16 are used to illustrate the supercapacitor disclosed by the present application and the preparation method, including most of the steps in Embodiment 1, except that:

the compound represented by structural formula 1 added to the organic electrolyte solution has the mass content shown in Table 1.

Activated carbon shown in Table 1 was used as positive and negative electrode materials.

Comparative Examples 1-9

Comparative Examples 1-9 are used to illustrate the supercapacitor disclosed by the present application and the preparation method, including most of the steps in Embodiment 1, except that:

the compound represented by structural formula 1 added to the organic electrolyte solution has the mass content shown in Table 1.

Activated carbon shown in Table 1 was used as positive and negative electrode materials.

Performance Test

The following performance tests were conducted on the organic electrolyte solution and supercapacitor prepared above:

Conductivity Test of Electrolyte Solution

The conductivity of electrolyte solutions with different formulations was tested by using the electromagnetic conductivity tester. The temperature was uniformly controlled at 25° C., and the readings after each stabilization were recorded (the average value was obtained after three tests).

Supercapacitor Test (1) Precycling (10 times): 25° C., charging cutoff voltage U, constant current 10 mA/F. Then discharged according to the lower limit voltage U/2 and constant current 10 mA/F.

(2) In a high-temperature box at 55° C.-65° C., it was charged with constant current 10 mA/F to the upper limit voltage U, and the constant voltage (U) was maintained for a certain time. The supercapacitor was taken out and cooled to 25° C., and then the charge-discharge test was conducted under the same conditions as precycling, and the capacity retention rate and ESR growth rate of the supercapacitor were calculated.

(3) The criterion of capacity retention rate ≤60%, and/or ESR growth rate ≥100% was adopted to determine the life of the supercapacitor.

(4) In the high and low temperature box, under the working temperature range of −55° C.-20° C., after constant temperature at intervals of 10° C. for a certain period of time, the charge-discharge test was conducted under the same test conditions as precycling, and the capacity and ESR of the supercapacitor were calculated.

1. The test results of Embodiments 1-12 and Comparative examples 1-9 were shown in Table 2.

TABLE 2

| | Capacitor capacity at 25° C. (F.) | | Capacity retention rate at −55° C. (%) | | ESR growth rate at −55° C. | | Capacity retention rate at 65° C. | |
|---|---|---|---|---|---|---|---|---|
| | 2.7 V | 3.0 V | 2.7 V | 3.0 V | 2.7 V | 3.0 V | 2.7 V | 3.0 V |
| Embodiment 1 | 77.1 | 78.4 | 82.3% | 78.6% | 117.2% | 125.9% | 72.1% | 67.2% |
| Embodiment 2 | 75.5 | 77.3 | 82.3% | 79.3% | 115.9% | 126.2% | 71.8% | 67.5% |
| Embodiment 3 | 76.83 | 77.4 | 83.1% | 78.2% | 119.5% | 124.8% | 72.4% | 68.2% |
| Embodiment 4 | 77.7 | 79.6 | 82.7% | 79.7% | 121.4% | 127.5% | 71.6% | 67.0% |
| Embodiment 5 | 77.7 | 78.4 | 81.9% | 78.9% | 118.3% | 123.8% | 71.1% | 67.5% |
| Embodiment 6 | 75.6 | 77.8 | 81.2% | 77.8% | 116.4% | 124.7% | 73.1% | 67.4% |
| Embodiment 7 | 74.9 | 76.9 | 82.9% | 78.9% | 117.6% | 127.3% | 72.6% | 67.8% |
| Embodiment 8 | 75.4 | 75.8 | 82.7% | 78.7% | 119.4% | 122.8% | 70.8% | 66.5% |
| Embodiment 9 | 75.5 | 78.2 | 82.2% | 77.6% | 118.3% | 126.3% | 71.5% | 68.4% |
| Embodiment 10 | 76.0 | 77.3 | 83.4% | 79.4% | 118.5% | 124.7% | 72.8% | 66.8% |
| Embodiment 11 | 75.2 | 78.5 | 82.7% | 79.7% | 117.5% | 127.3% | 73.1% | 65.2% |
| Embodiment 12 | 75.2 | 77.3 | 83.5% | 79.5% | 116.9% | 122.8% | 74.6% | 67.3% |
| Comparative example 1 | 74.5 | 78.3 | 63.2% | 55.6% | 402.2% | 462.2% | 68.6% | 50.1% |
| Comparative example 2 | 75.02 | 77.4 | 59.3% | 57.9% | 408.9% | 459.3% | 69.4% | 48.9% |
| Comparative example 3 | 74.5 | 78.6 | 57.8% | 54.8% | 4015% | 471.6% | 70.1% | 47.6% |
| Comparative example 4 | 75.3 | 77.4 | 59.2% | 55.8% | 407.2% | 464.3% | 67.9% | 46.9% |
| Comparative example 5 | 65.4 | 66.3 | 52.2% | 49.6% | 431.3% | 485.9% | 60.5% | 49.0% |
| Comparative example 6 | 67.8 | 67.4 | 54.1% | 47.8% | 423.2% | 456.2% | 58.6% | 46.8% |
| Comparative example 7 | 66.4 | 68.2 | 50.6% | 48.6% | 417.7% | 474.8% | 53.2% | 47.3% |
| Comparative example 8 | 67.5 | 67.9 | 49.7% | 47.3% | 420.6% | 467.5% | 51.8% | 45.9% |
| Comparative example 9 | 68.4 | 67.8 | 46.3% | 48.3% | 442.9% | 485.6% | 58.3% | 45.6% |

According to the test results in Table 2, in the present application, when the relationship among the specific surface area of the porous carbon material BET, the ratio Vt of mesoporous specific surface area to micropore specific surface area and the addition amount Mt of the compound represented by structural formula 1 meets the condition of $$0.1 \le \frac{BET * Vt * Mt}{1700} \le 7.5,$$

the energy density of the supercapacitor at ultra-low temperature can be effectively improved, and the electrochemical performance of the supercapacitor at high temperature and room temperature would not be deteriorated. However, if $$\frac{BET * Vt * Mt}{1700}$$

is too high or too low, the performance of supercapacitor would deteriorate. 2. The test results of Embodiments 13-16 are shown in Table 3.

TABLE 3

| | Conductivity of electrolyte solution | Capacitor capacity at 25° C. (F.) | | Capacity retention rate at −55° C. (%) | | ESR growth rate at −55° C. | | Capacity retention rate at 65° C. | |
|---|---|---|---|---|---|---|---|---|---|
| | ms/cm | 2.7 V | 3.0 V | 2.7 V | 3.0 V | 2.7 V | 3.0 V | 2.7 V | 3.0 V |
| Embodiment 13 | 49.2 | 78.2 | 78.4 | 85.3% | 78.9% | 118.2% | 125.9% | 72.5% | 68.2% |
| Embodiment 14 | 48.7 | 78.5 | 77.3 | 84.6% | 79.6% | 116.9% | 126.2% | 72.3% | 68.5% |
| Embodiment 15 | 49.0 | 77.8 | 77.4 | 84.1% | 78.8% | 117.5% | 124.8% | 72.6% | 68.2% |
| Embodiment 16 | 48.5 | 77.5 | 79.6 | 84.7% | 79.8% | 120.4% | 127.5% | 72.4% | 68.0% |

According to the test results in Table 3, even if different compounds represented by structural formula 1 are used, there are still similar laws among the compound, the specific surface area of the porous carbon material BET, and the ratio Vt of mesoporous specific surface area to micropore specific surface area, which shows that different compounds represented by structural formula 1 can improve the high and low temperature performance of supercapacitors universally, on the premise that the condition of $$0.1 \le \frac{BET * Vt * Mt}{1700} \le 7.5$$

is satisfied.

The above are merely preferred embodiments of the application, but not intended to limit the application. Any modification, equivalent substitution and improvement made within the spirit and principle of the application shall be included in the protection scope of the application.

The invention claimed is:

1. A supercapacitor, comprising a positive electrode, a negative electrode and an organic electrolyte solution, wherein the organic electrolyte solution comprises an organic electrolyte, a proton inert solvent and an additive, and the additive comprises a compound represented by structural formula 1:

Structural formula 1

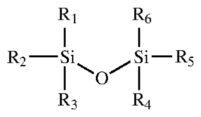

wherein $R_1$-$R_6$ are each independently selected from a hydrocarbon group with 1-5 carbon atoms, a siloxane group substituted by a hydrocarbon group with 1-3 carbon atoms, an unsubstituted siloxane group, or hydrogen; the positive electrode and negative electrode are both porous carbon materials, and the porous carbon material and the compound represented by structural formula 1 meet the following condition:

$$0.1 \le \frac{BET * Vt * Mt}{1700} \le 7.5$$

where BET is a specific surface area of the porous carbon material in $m^2/g$; Vt is a ratio of mesoporous specific surface area of the porous carbon material to micropore specific surface area of the porous carbon material; Mt is a mass percentage of the compound represented by structural formula 1 in the organic electrolyte solution, and the unit is %.

2. The supercapacitor of claim 1, wherein $R_1$-$R_6$ are each independently selected from an alkyl group with 1-5 carbon atoms, a dimethylsiloxane group, a trimethylsiloxane group or hydrogen.

3. The supercapacitor of claim 1, wherein the compound represented by structural formula 1 is selected from one or more of the following compounds:

Compound 1

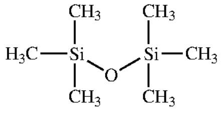

Compound 2

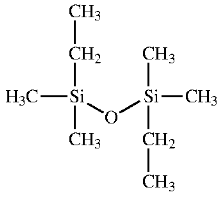

-continued

Compound 3

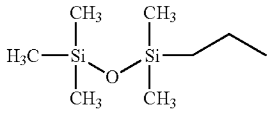

Compound 4

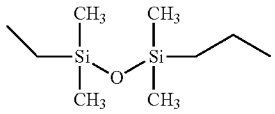

Compound 5

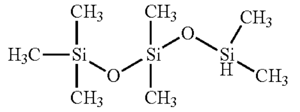

Compound 6

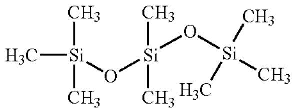

Compound 7

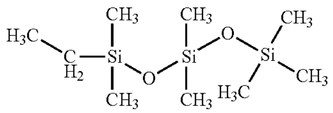

Compound 8

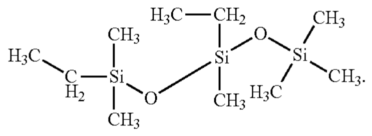

4. The supercapacitor of claim 1, wherein the addition amount Mt of the compound represented by structural formula 1 is 0.1%-5% based on a total mass of the organic electrolyte solution being 100%.

5. The supercapacitor of claim 1, wherein the specific surface area of the porous carbon material BET is 1200-2000 $m^2/g$.

6. The supercapacitor of claim 1, wherein the ratio Vt of mesoporous specific surface area of the porous carbon material to micropore specific surface area of the porous carbon material is 0.9-3.5.

7. The supercapacitor of claim 6, wherein the mesoporous specific surface area of the porous carbon material is 800-1400 $m^2/g$, and the micropore specific surface area of the porous carbon material is 400-900 $m^2/g$.

8. The supercapacitor of claim 1, wherein the porous carbon material is selected from activated carbon.

9. The supercapacitor of claim 1, wherein in the organic electrolyte solution, a concentration of the organic electrolyte is 0.5-3.0 mol/L.

10. The supercapacitor of claim 1, wherein the organic electrolyte is selected from one or more of tetraethyl ammonium tetrafluoroborate, tetramethyl ammonium tetrafluoroborate, tetrapropyl ammonium tetrafluoroborate, tetrabutyl ammonium tetrafluoroborate, methyl triethyl ammonium tetrafluoroborate, diethyl dimethyl ammonium tetrafluoroborate, ethyl trimethyl ammonium tetrafluoroborate, N,N-dimethyl pyrrolidine ammonium tetrafluoroborate, N-ethyl-N-methyl pyrrolidine ammonium tetrafluoroborate, N-propyl-N-methyl pyrrolidine ammonium tetrafluoroborate, N—N-tetramethylene pyrrolidine ammonium tetrafluoroborate, spiro-(1,1')-dipyrrolidine ammonium tetrafluoroborate, N,N-dimethyl piperidine ammonium tetrafluoroborate, N,N-diethyl piperidine ammonium tetrafluoroborate, N,N-dimethyl morpholine ammonium tetrafluoroborate, 1-ethyl-3-methylimidazole ammonium tetrafluoroborate, bis (trifluoromethylsulfonyl) imines such as tetraethyl ammonium tetrafluoroborate, tetramethyl bis (trifluoromethylsulfonyl) iminium salt, tetrapropyl bis (trifluoromethylsulfonyl) iminium salt, tetrabutyl bis (trifluoromethylsulfonyl) iminium salt, methyl triethyl bis (trifluoromethylsulfonyl) iminium salt, diethyl dimethyl bis (trifluoromethylsulfonyl) iminium salt, trimethyl ethyl bis (trifluoromethylsulfonyl) iminium salt, N,N-dimethyl pyrrolidine bis (trifluoromethylsulfonyl) iminium salt, bis (fluorosulfonyl) iminium salt such as tetraethyl ammonium tetrafluoroborate, tetramethyl bis (fluorosulfonyl) iminium salt, tetrapropyl bis (fluorosulfonyl) iminium salt, tetrabutyl bis (fluorosulfonyl) iminium salt, methyltriethyl bis (fluorosulfonyl) iminium salt, diethyldimethyl bis (fluorosulfonyl) iminium salt, trimethyl ethyl bis (fluorosulfonyl) iminium salt, N,N-dimethyl pyrrolidine bis (fluorosulfonyl) ammonium salt, ammonium hexafluorophosphate such as tetraethyl ammonium hexafluorophosphate, tetramethyl ammonium hexafluorophosphate, tetrapropyl ammonium hexafluorophosphate, tetrabutyl ammonium hexafluorophosphate, methyl triethyl ammonium hexafluorophosphate, triethyl methyl ammonium hexafluorophosphate and diethyl dimethyl ammonium hexafluorophosphate.

* * * * *